Figure 4:
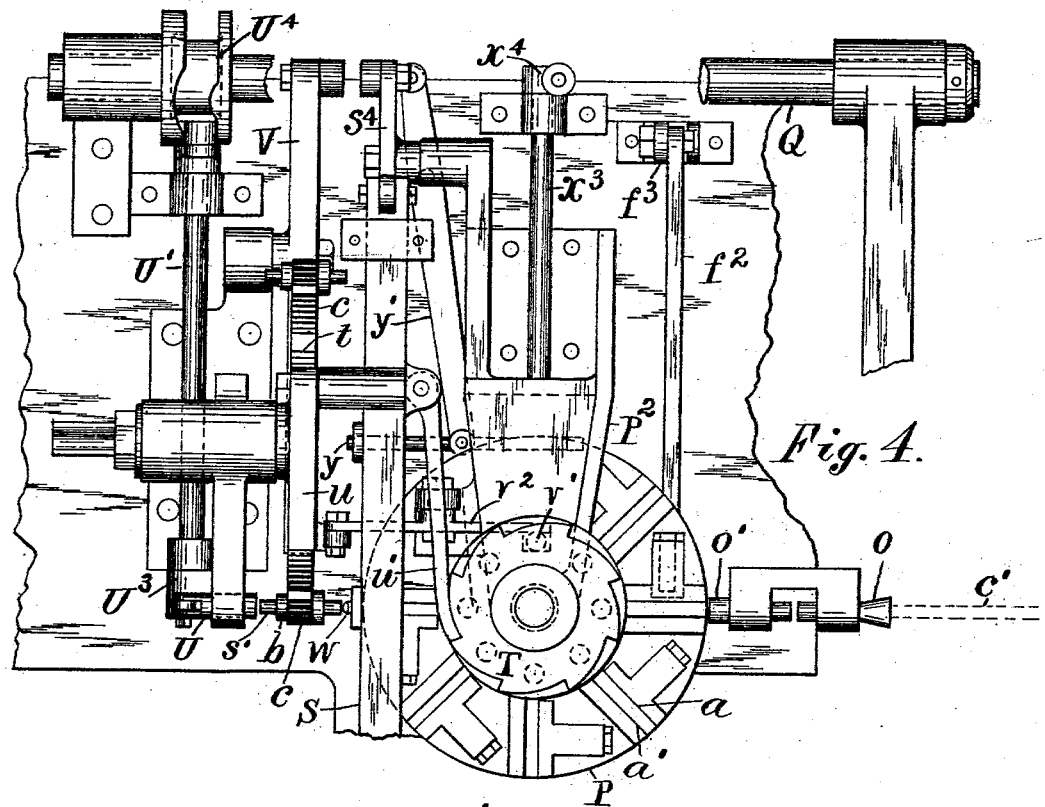

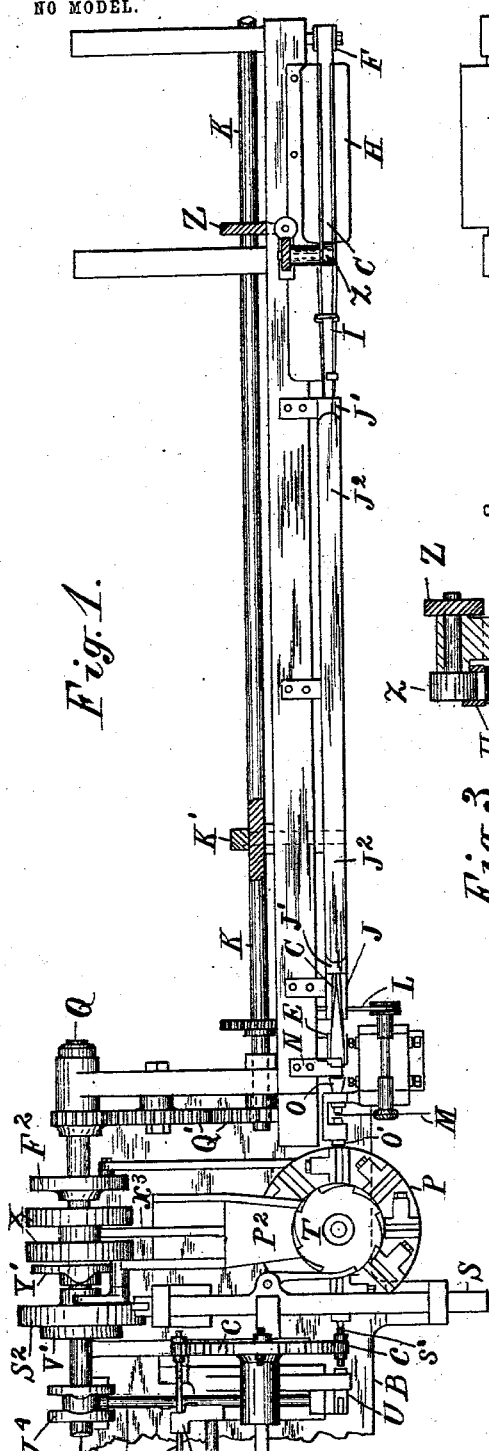
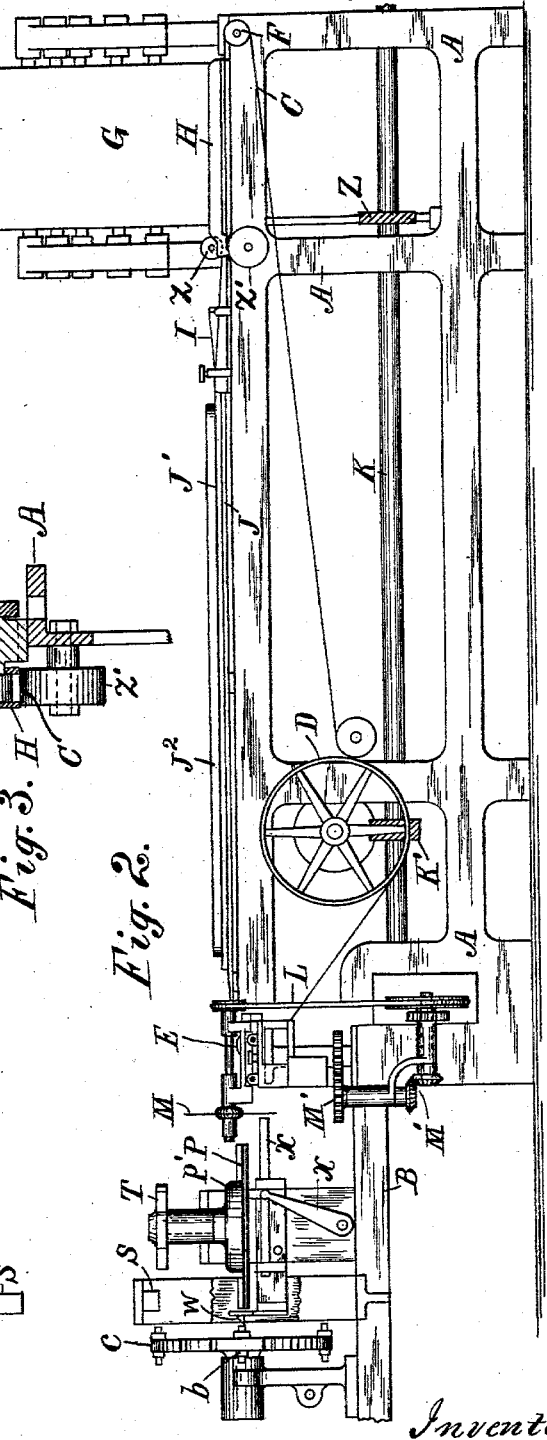

No. 743,739. PATENTED NOV. 10, 1903.
F. J. LUDINGTON.
MACHINE FOR MAKING CIGARETTES FROM CONTINUOUS FILLER ROD.
APPLICATION FILED APR. 22, 1902. RENEWED APR. 9, 1903.
NO MODEL. 5 SHEETS—SHEET 2.

Attest:
L. Lee.
Theodore Dalton

Inventor.
Frank J. Ludington, per
Thomas S. Crane, Atty.

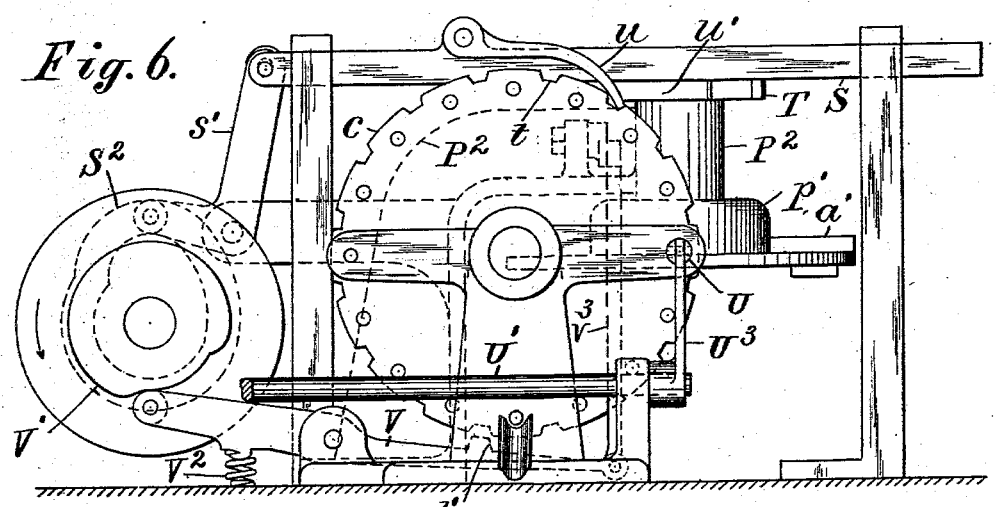
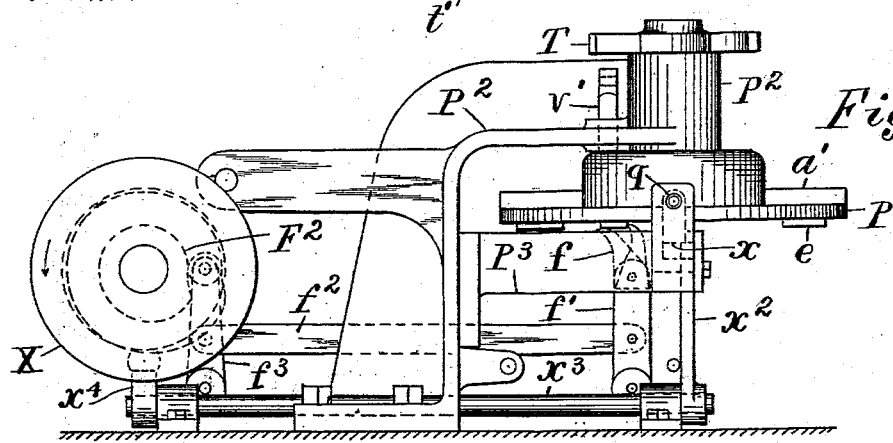
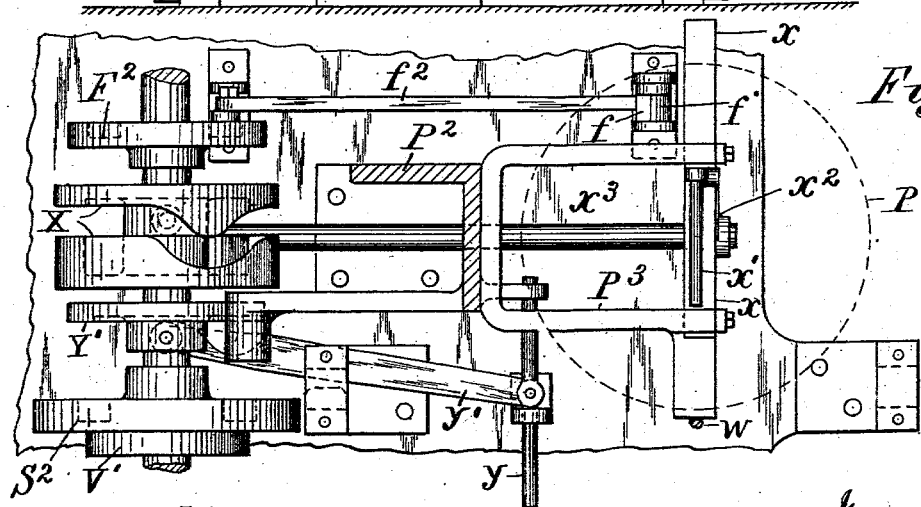

No. 743,739. PATENTED NOV. 10, 1903.
F. J. LUDINGTON.
MACHINE FOR MAKING CIGARETTES FROM CONTINUOUS FILLER ROD.
APPLICATION FILED APR. 22, 1902. RENEWED APR. 9, 1903.
NO MODEL. 5 SHEETS—SHEET 4.
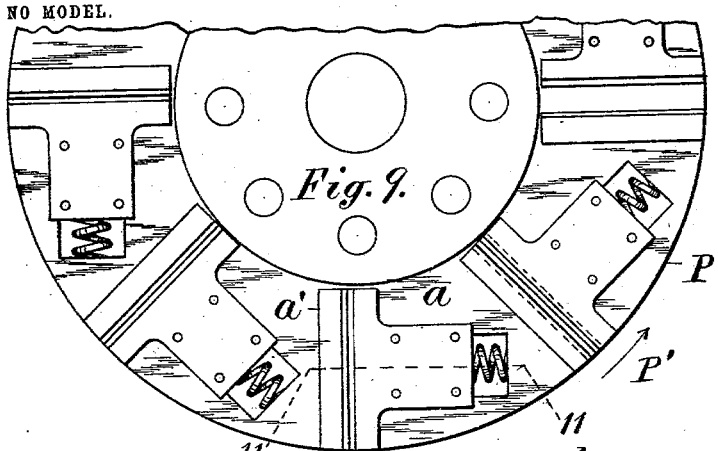
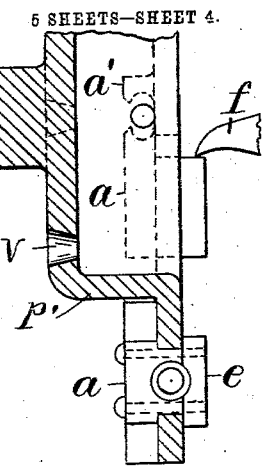
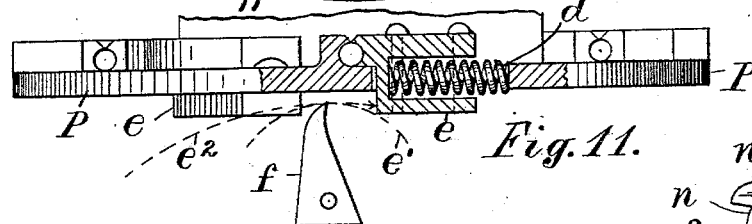
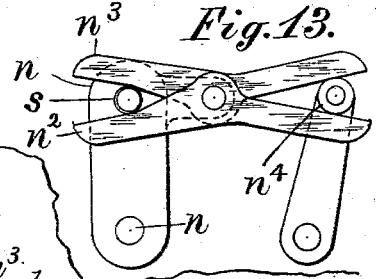
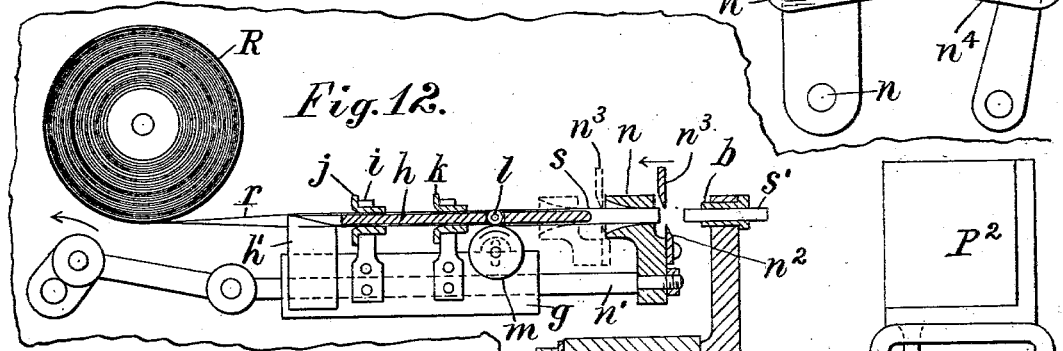
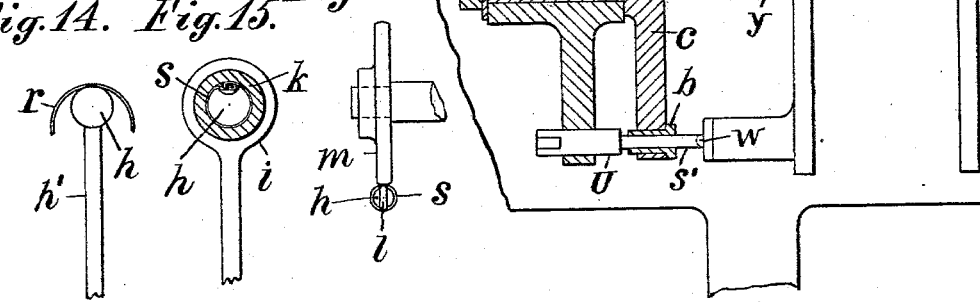

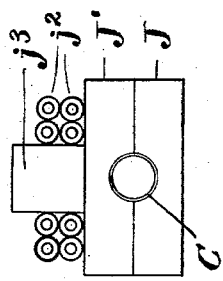
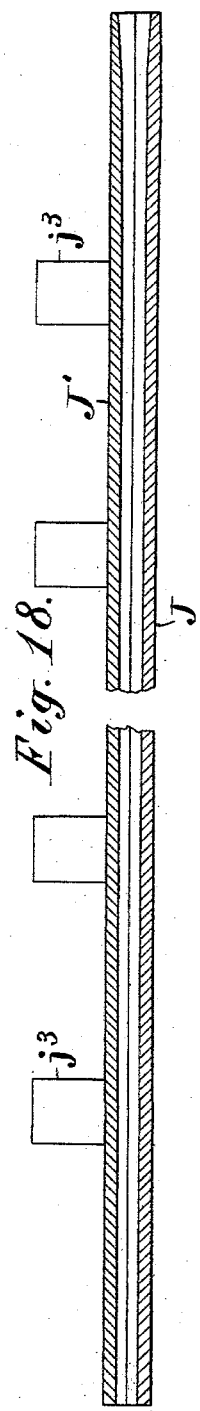
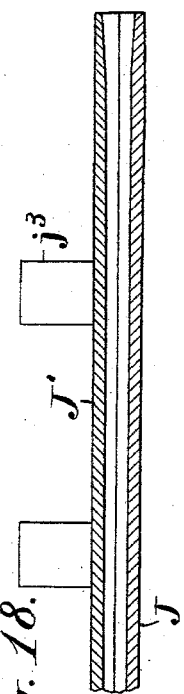
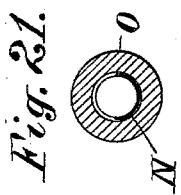
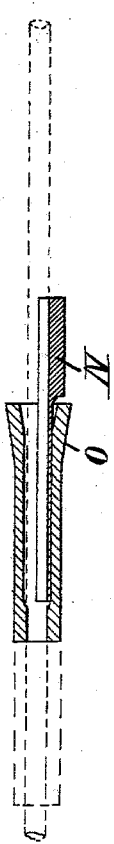
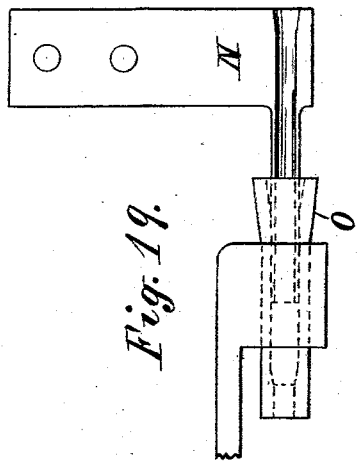

No. 743,739.    Patented November 10, 1903.

UNITED STATES PATENT OFFICE.

FRANK J. LUDINGTON, OF WATERBURY, CONNECTICUT.

MACHINE FOR MAKING CIGARETTES FROM CONTINUOUS FILLER-ROD.

SPECIFICATION forming part of Letters Patent No. 743,739, dated November 10, 1903.

Application filed April 22, 1902. Renewed April 9, 1903. Serial No. 151,920. (No model.)

*To all whom it may concern:*

Be it known that I, FRANK J. LUDINGTON, a citizen of the United States, residing at 63 Bank street, Waterbury, county of New Haven, State of Connecticut, have invented certain new and useful Improvements in Machines for Making Cigarettes from Continuous Filler-Rod, fully described and represented in the following specification and the accompanying drawings, forming a part of the same.

The object of the present invention is partly to furnish an improved means of forming a continuous cigarette-filler with the tobacco "set" permanently in the desired form, so as to evenly fill the cigarette-shell and retain such form when the cigarettes are packed and stored for sale.

The invention also includes special means to form individual cigarette-shells and deliver them to a shell-carrier and special means for inserting in the shells the individual fillers which are cut from the continuous filler-rod.

In the present invention I dispense with the whole or greater part of the pressing and shaping wheels which are commonly used to compact and shape the tobacco in the filler-rod and substitute a shaping-die having a closed tapering channel of great length relative to its width, through which the filler is drawn, inclosed in a tape which is pressed upon the filler-rod by such die. The die may be heated, so that the tape and filler are protractedly and simultaneously subjected to heat and pressure, which I have found to be very effective in "setting" the filler in the desired shape.

The shells required to receive individual fillers are sometimes made by curling and seaming an endless strip of paper and cutting the shells from the tube thus formed; but I have found that such individual shells are very difficult to handle after their separation from the paper tube; and my present invention includes a pair of shears arranged to sever the shells successively from the paper tube and mounted with a guide for the tube to reciprocate to and from a shell-carrier, so as to deliver each shell to the carrier as it is severed from the tube.

The carrier is shown in the annexed drawings of disk form with a series of transverse sockets around its edge, and the delivery of the shells into such sockets by the shears avoids any intermediate handling or possible injury to the shells, while the carrier furnishes the means of then presenting the shells to the filler-inserting devices. In the machine shown in the drawings a so-called "filler-wheel" is provided with a series of radial cavities or molds, into which the individual fillers are dropped as they are cut from the filler-rod, and the filler-wheel carries the fillers successively into line with the shells presented successively past the shell-carrier disk. The filler-wheel is preferably formed with an internal chamber to admit an ejector, which operates through apertures in the periphery of the chamber in line with the radial cavities to force the fillers successively into the shells. The machine thus continuously forms at the same rate the cigarette-shells and the fillers for insertion in the same, and when the fillers are thus inserted the completed cigarettes are discharged successively from the shell-carrier.

The invention also includes details of construction, which are set forth in the claims and will be understood by reference to the annexed drawings, in which—

Figure 5:
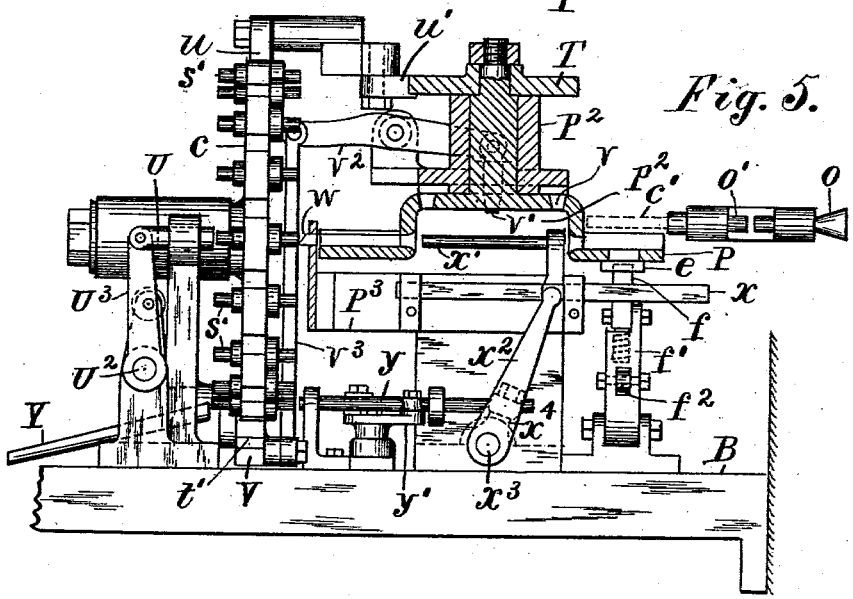

Figure 1 is a plan of the apparatus excepting the shell-forming devices. Fig. 2 is an elevation of the same. Fig. 3 is a cross-section at the edge of the tobacco-gathering wheel. Fig. 4 is a plan of the filler-wheel and shell-carrier with their attachments. Fig. 5 is an elevation of the same with the filler-wheel in vertical section at the center line where hatched. Fig. 6 is a side elevation of the shell-carrier and its attachments. Fig. 7 is a side elevation of the filler-wheel and its attachments. Fig. 8 is a plan of the cams which actuate the filler-wheel, the shell-carrier, and their various attachments, the filler-wheel being indicated merely by dotted lines. Fig. 9 is a plan of part of the filler-wheel, upon a larger scale, to show the construction of the molds. Fig. 10 is a section taken on a vertical line through Fig. 9, and Fig. 11 is a section on line 11 11 in Fig. 9. Fig. 12 is a plan of the shell-forming devices with the shell-carrier and part of its attachments with certain parts in section at the center line where hatched. Fig. 13 is an end elevation of the movable shears for severing and feeding the shells to the shell-carrier. Fig. 14 is an end view of the forming and crimping mandrel for the paper tube. Fig. 15 is a section of one of the seaming-guides for the paper tube and its bracket-support, and Fig. 16 is a section of the mandrel and the crimping-wheel to seam the paper tube. Fig. 17 shows the entering end of the shaping-die J J', and Fig. 18 is a longitudinal section of the same broken in the middle for want of room upon the drawings. Fig. 19 is a plan of the bridge for leading the filler-rod to the cutter. Fig. 20 is a longitudinal section of the same, and Fig. 21 a cross-section of the bridge and the conical filler-guide which is fitted movably thereto. Figs. 18, 19, and 20 are drawn upon a larger scale than the preceding figures, and Figs. 17 and 21 are upon a still larger scale.

A designates the frame of the machine, with an extension-bed B at the left-hand end to support the shell forming and filling appliances.

C designates an endless tape carried over a driving-wheel D and over guide-pulleys E and F.

A tobacco-feeder G is shown in Fig. 2 with a downwardly-projecting spout which delivers the tobacco upon the tape as it passes between guides H.

A so-called "barrel-guide" I of ordinary construction receives the tape with its continuous charge of tobacco and curls the edges of the tape one over the other, so as to roughly form the filler-rod C'.

*Shaping and forming the filler-rod.*—The tape and rod thus formed are conducted through a very long shaping-die having a bottom bar J and a cap J', both of which are grooved to fit the opposite sides of the tape and filler, the groove having the cross-section required to give the filler the desired shape. The two grooves form a closed channel, which is gradually tapered from the entering end, so as to gradually compress the tape and its inclosed filler-rod. The channel is preferably heated, which may be done by applying heat to either the bottom bar or the cap, or both, by means of gas, steam, electricity, or other suitable agency. Means for heating the cap by electricity is shown in Figs. 2, 17, and 18, consisting of heated wires $j^2$ with refractory coating (shown only in Fig. 17) wound back and forth over studs $j^3$ on the cap J'.

A driving-shaft K is shown connected with the wheel D by gears K' and by pulleys and cord L with the usual rotary cutter M for dividing the filler-rod.

Gears M' and suitable connections operate in a manner well known to give the cutter-spindle a longitudinal reciprocating motion, so as to travel with the advancing filler-rod, which divides the same into individual fillers. The filler is delivered through the usual guides o o', which support it during the operation of the cutter. A bridge N is shown attached to the frame A adjacent to the tape-pulley E to strip the filler from the tape as it emerges from the shaping-dies J J' and support it as it is delivered to the reciprocating guides o and o'. The bridge is of trough shape and is shown in Figs. 19 and 20 of sufficient length for one end to remain in the guide o as the latter moves forward and to enter the guide when the same is moved backward. (See Fig. 20.) The filler is thus supported adequately during its delivery to the reciprocating guide, the bridge serving as a stripper in relation to the tape and as a support in relation to the guide.

*Transferring and pressing the individual fillers.*—The guide o' in its forward movement travels over the edge of a horizontal filler-wheel P, having mold-cavities which are open laterally upon the upper side, so that as the guide o moves backwardly it discharges a filler c' over the mold, into which it readily drops. The filler-wheel turns the cavities successively in line with a socket b upon the shell-carrier disk c for delivering the fillers to their respective shells. The filler may be subjected to a finishing pressure during its transit by forming the cavities upon the filler-wheel with jaws movable in relation to one another.

Each mold is shown (see Figs. 9 to 11) with a movable pressing-jaw a and a fixed or stationary jaw a', which when together form the closed cavity (seen in Fig. 11) of the cross-section desired, whether round or oval, to suitably shape the filler. The pressing-jaw a is forced normally toward the fixed jaw by a spring d and is provided with a projection forming a dog e upon the under side of the filler-wheel by which the mold may be opened when the filler is deposited therein.

Figs. 5, 9, and 11 show a toe f arranged to stand in the path of the dog as the mold is turned into its receiving position, such toe being jointed upon the end of an arm f', which is oscillated by a shaft $f^2$ and cam $F^3$ upon a shaft Q. (See Figs. 1 and 7.) Such shaft is connected with the driving-shaft K by gears Q'. The shaft $f^2$ is oscillated by an arm $f^3$, fitted to a cam-groove in the cam $F^3$. A spring upon the arm f' holds the toe f normally projected; but the movement of each dog over the same (as the filler-wheel is turned in the direction of the arrow P' in Fig. 9) bends the toe downward in the direction of the dotted curve e' in Fig. 11 until the dog has passed the toe, which then assumes the erect position thereon. The cam then operates to move the arm with the toe in the direction of the dotted curve $e^2$ and opens the mold by separating the jaws as the filler is dropped into the cavity. Fig. 10 shows in dotted lines the movable jaw a of the mold pressed open by the toe f. The rotation of the filler-wheel, as indicated by the arrow P' in Fig. 9, is in the same direction as the operative movement of the toe f, so that the dogs upon all of the mold-jaws pass freely over the toe during the intermittent shifting of the filler-wheel, and the wheel is then held stationary while the toe holds the mold open to receive a filler.

The spring-pressure holds the individual fillers in the desired shape as they are transferred into line with the shells upon the shell-carrier $c$.

*Formation of shells.*—Figs. 12 to 16 show in diagrammatic form mechanism by which a continuous paper tube may be formed and seamed and delivered in sections to the sockets $b$ upon the shell-carrier. $g$ designates a stand to which the foot $h'$ of a seaming-mandrel $h$ is attached (see Fig. 14) and carrying also the bracket-supports $i$ for seaming-guides $j$ and $k$, which embrace the mandrel $h$ with sufficient clearance for the paper tube to pass. A paper roll R delivers a paper ribbon $r$ to the mandrel, upon which the paper is seamed into a tube by the seaming-guides and crimping-wheels.

A small crimping-wheel $l$ is fixed in the mandrel beyond the guides $k$, and a crimping-wheel $m$, rotated by suitable means in the direction of the arrow shown thereon, is fixed upon the stand $g$ and adjustable to and from the wheel $l$, so as to be pressed firmly against the same. The wheel $m$ has its pivot fixed movably in a slot in the stand $g$ to permit such adjustment, as shown in Fig. 12.

The guide $j$ bends the paper around the mandrel loosely, while the guide $k$ (shown in Fig. 15) overlaps the edges of the paper in line with the edges of the crimping-wheels. The crimping-wheels are commonly serrated upon the edge and operate in a manner well known to indent the overlapped edges of the paper and unite them together without paste. A shear-guide $n$ is reciprocated in line with the paper tube by a rod $n'$, which may be actuated by any suitable means, the guide having, as shown in Fig. 13, shear-blades $n^2$ and $n^3$ hinged thereon, with arms projected backwardly to be actuated by a roller $n^4$ upon a vibrating crank. In practice the arms of the two shear-blades are pressed normally toward the roll $n^4$ by suitable means. Such means of operating shear-blades is common in cigarette-machines and is not, therefore, illustrated further. The crank which carries the roll $n^4$ may be oscillated by any suitable means to move the blade $n^3$ and sever the paper tube $s$ at the desired time. Fig. 12 shows a shell $s'$ in the socket $b$ in line with the paper tube, from which it has been severed by the shears, and the shears are represented as moving backward from the end of the shell to permit the carrier to rotate. By suitable means the shell-carrier is rotated at the instant the severing is effected, thus bringing an empty socket in line with the paper tube.

The shears by the reciprocation of the shear-guide $n$ is carried back upon the paper tube the length of one shell, (to the position indicated by the dotted lines $n^3$ in Fig. 12,) and the shears is then advanced with the paper until the tube has entered the empty socket $b$, where the shell is severed from the paper tube by the closing of the shears.

*Rotation of shell-carrier and filler-wheel.*—The spindle of the filler-wheel is mounted in a vertical bracket-bearing $P^2$ and provided at its upper end with a ratchet-wheel T. Ratchet notches or teeth $t$ are formed in the periphery of the shell-carrier disk $c$, and a pawl-bar S is mounted near the adjacent edges of the ratchet-wheel T and the disk $c$ and reciprocated by a lever $S'$ and cam $S^2$. Pawls $u$ and $u'$ are pivoted to the bar S and fitted to the wheel T and notches $t$, so as to rotate the shell-carrier and the filler-wheel in unison.

The plate of the shell-carrier is formed with a hollow hub $p'$, containing a central chamber $p^2$, in which an ejector $x$ is reciprocated in line with holes $q$, which are formed in the hub $p'$ at the inner ends of the mold-cavities. The top of the hub $p'$ is formed with a series of locking-holes $v$, corresponding with the teeth upon the ratchet-wheel T, and a lock-pin $v'$ is fitted to such holes and reciprocated by an arm $v^2$. At the under edge of the carrier-disk $c$ a lever V is pivoted and furnished with a lock-tooth $t'$, fitted to the notches $t$ in the edge of the disk, and such lever is oscillated by a cam $V'$. (Shown in Figs. 1, 6, and 8.) The lever V is connected by a link $v^3$ with the arm $v^2$, and the pin $v$ is thus actuated simultaneously with the tooth $t'$, and one of such agents thus operates to lock the filler-wheel when the other locks the carrier-disk.

A spring $V^2$ is applied to the lever V to hold the lock-pin and tooth normally clear from the filler-wheel and carrier-disk. The cam $V'$ operates when the cam $S^2$ has completed its movement to hold the filler-wheel and carrier-disk locked during the filling of a single shell, and the locking devices are arranged to stop the filler-wheel with the mold-cavity in line with the shell-socket upon the disk $c$.

*Shell-filling devices.*—A bracket $P^3$ is attached to the foot of the bracket-bearing $P^2$ to support a tubular nozzle $w$ between the mold-cavities and the shell which is to receive a filler $c'$ therefrom, and such bracket supports in suitable guides a slide $x$, which sustains an ejector $x'$ within the chamber $p^2$ in the center of the filler-wheel. The slide is reciprocated by an arm $x^2$, connected by a shaft $x^3$ and arm $x^4$ with a cam X, constructed to reciprocate the slide and actuate the ejector when desired. A nozzle $w$ is shown upon the opposite side of the filler-wheel from the cutter M, and the ejector $x'$, one of the cavities in the filler-wheel, the nozzle $w$, and one of the shells are always in line when the filler-wheel and shell-carrier are locked, so that the ejector may force the fillers successively into the shells. A locator U is mounted in line with the shell opposite to the nozzle $w$ and is actuated by a shaft $U'$, arm $U^3$, and cam $U^4$ to press each of the shells in succession upon the nozzle and to support the outer end of the shell while the filler is inserted therein. The cam is also constructed to retract the locator when the filler is inserted in the shell, which permits the ejector $x'$ to push the finished cigarette outward in its socket $b$, so as to strip the shell from the nozzle $w$. The finished cigarette thus clears the nozzle when the shell-carrier is rotated to present another shell to the nozzle for filling. The filled cigarettes $c^2$ when moved to the bottom of the carrier-wheel come in line with a discharger $y$, which pushes the finished cigarette through the socket $b$ into a trough Y, (shown in Figs. 5 and 6,) by which the cigarettes are delivered into any suitable receptacle. The cigarettes may be discharged to a so-called "stacker," as is common in such constructions, for piling the cigarettes parallel to facilitate packing them in boxes. The discharger $y$ is reciprocated at a suitable time by a lever $y'$ and cam $Y'$.

From the above description it will be seen that all the operations of forming the continuous filler-rod, cutting the fillers therefrom, pressing the individual fillers separately, forming the paper shells, presenting them to the fillers, inserting the latter therein, and discharging the finished cigarettes are accomplished wholly by automatic means which operate successively and are capable readily of forming one hundred cigarettes per minute. The subjection of the filler-rod to pressure in a closed channel for a considerable time greatly improves the character of the filler, as it sets the filler permanently in the desired shape, and thus enables the completed cigarette to retain its form more perfectly when kept before using.

As the tape moves rapidly in this class of machines, it is obvious that the filler can only be subjected to pressure for a considerable length of time by using a shaping-die or presser of extraordinary length in proportion to the breadth of the channel, and such a shaping-die is shown at J J' in the drawings. The application of heat to the pressing-die permits it to be made rather shorter than otherwise.

In apparatus for forming individual fillers directly from the shredded tobacco the fibers of the tobacco are generally deposited at various angles throughout the mass of the filler, which does not produce so smooth and even a filler as one in which the fibers are disposed longitudinally. In forming a continuous filler-rod upon a tape the fibers of the tobacco which are deposited upon the tape are distributed lengthwise and interlock with one another in a suitable manner to form a very smooth and uniform filler, which presents a very even feeling to the fingers when the cigarette is handled. The drawings show simply one illustration of the invention; but the form of the parts is immaterial, and they may be modified in a very great degree without departing from the spirit of the invention. I do not, therefore, limit myself to the construction shown herein.

In Figs. 1, 2, and 3 a "gathering-wheel" $z$ is shown pressed upon the top of the tobacco over the tape C at the mouth of the barrel-guide I, a wheel $z'$ being shown underneath the tape to support the same at such point. Such wheel may sometimes be used to gather the tobacco in a more coherent mass before it is inclosed in the wrapper by the barrel-guide I. The wheel $z$ is shown rotated by spiral gears and connections Z to the shaft K; but the wheel $z'$ is merely an idler. Such gathering-wheel is not essential to my invention.

In the present application I have claimed means for subjecting the tape and tobacco filler simultaneously to heat and pressure to set the filler in the desired shape. In this construction the tobacco is not pressed within a wrapper, nor is any wrapper seamed upon tobacco before it is subjected to heat and pressure, as in my allowed application, Serial No. 84,609, filed December 4, 1901, for patent on cigarette forming, wrapping, and ironing appliances. My present construction is thus distinguished from the means for ironing a finished cigarette as well as from the heating-chambers which have sometimes been used to heat a tobacco filler without any pressure, such heating-chambers not operating to set the filler in the desired form, but merely to soften it for subsequent treatment in the cigarette-machine.

Having thus set forth the nature of the invention, what is claimed herein is—

1. In an apparatus for making individual fillers from a continuous filler-rod, the combination, with an endless moving tape, a feeder for depositing tobacco thereon, a feed-guide for curling over the edges of the tape and roughly shaping the tobacco filler within the same to form a filler-rod, and means for dividing the filler-rod and supplying the fillers with paper shells, of means arranged intermediate to the feed-guide and the shell-applying devices for subjecting the tape and filler protractedly and simultaneously to heat and pressure to set the filler-rod in the desired shape.

2. In an apparatus for making individual tobacco fillers and supplying the same to individual paper shells, the combination, with an endless moving tape and a feeder for depositing tobacco thereon and a feed-guide for curling over the edges of the tape and roughly shaping the tobacco filler within the same, and means for dividing the filler-rod and supplying the fillers with paper shells, of a shaping-die arranged intermediate to the feed-guide and the shell-supplying devices, such shaping-die having a closed channel fitted to the tape and filler and having a great length relative to its width for gradually compressing the tape upon the filler-rod, and means for heating the shaping-die to simultaneously iron and press the filler-rod within the tape, substantially as herein set forth.

3. In a cigarette-machine, the combination, with means for forming a continuous filler-rod, of means for dividing the rod into individual fillers, a filler-wheel with a series of molds or cavities to receive such fillers successively, a rotary shell-carrier adjacent to the wheel, means for supplying shells to the carrier, and means for transferring the individual fillers from the filler-wheel to the shells.

4. In a cigarette-machine, the combination, with an endless moving tape and a feeder for depositing tobacco thereon, of a feed-guide for curling over the edges of the tape and roughly shaping the tobacco filler, a shaping-die having a closed channel fitted to the tape and filler with a cap removable to expose the same, means for heating the shaping-die whereby the cigarette-rod is simultaneously ironed and pressed, means for cutting fillers of suitable length from the continuous cigarette-rod, a filler-wheel having a series of open molds adapted to receive the fillers laterally and provided each with a movable jaw to press the fillers, and means for discharging the fillers from the molds when pressed.

5. In a cigarette-machine, the combination, with an endless moving tape and a feeder for depositing tobacco thereon, of a feed-guide for curling over the edges of the tape and roughly shaping the tobacco filler, a shaping-die having a tapering channel to form and "set" the cigarette-rod within the tape, cutters for dividing the cigarette-rod into individual fillers, a filler-wheel provided with a series of molds having each a movable jaw at one side and arranged to receive the fillers cut from the continuous cigarette-rod, an adjacent shell-carrier with a series of sockets therein, means for feeding cigarette-shells to the sockets, and means for forcing the fillers from the molds into the shells.

6. In a cigarette-machine, the combination, with an endless moving tape and a feeder for depositing tobacco thereon, of a feed-guide for curling over the edges of the tape and roughly shaping the tobacco filler-rod, a shaping-die having a tapering channel to form and "set" the cigarette-rod within the tape, a means for severing the filler-rod into individual fillers, a filler-wheel provided with a series of molds having each a movable jaw at one side and arranged to receive laterally the fillers cut from the continuous filler-rod, an adjacent shell-carrier with a series of sockets therein, means for feeding cigarette-shells to the sockets, a nozzle supported between the filler-wheel and shell-carrier, means for forcing the shells successively upon the nozzle, and means for forcing the fillers successively from the molds through the nozzle into the shells.

7. In a cigarette-machine, the combination, with means to form a continuous cigarette-rod and cutter to divide the same into individual fillers, a filler-wheel having radial molds with a jaw at one side of each to press the contents and a chamber within the wheel with an ejector arranged within the chamber and movable outwardly through the molds, of an adjacent shell-carrier having sockets to receive the shells, a nozzle supported between the filler-wheel and the shell-carrier, means for forcing the shells successively upon the nozzle, and means for reciprocating the ejector to force the fillers successively from the molds through the nozzle into the shells.

8. In a cigarette-machine, the combination, with means for forming a continuous filler-rod and dividing the same into individual fillers, of a horizontal wheel having radial cavities to receive the fillers and a chamber within the wheel to receive an ejector, means for turning the wheel to shift the position of the cavities, a slide below the plane of the wheel with upright support carrying an ejector within the chamber in line with the cavities when shifted, and means for reciprocating the slide to eject the fillers from the cavities.

9. In a cigarette-machine, the combination, with means for forming a continuous filler-rod and dividing the same into individual fillers, of a horizontal wheel having radial cavities to receive the fillers and a chamber within the wheel to receive an ejector, ratchet mechanism and a cam for intermittingly turning the wheel to shift the cavities, the slide $x$ below the plane of the wheel with upright support carrying an ejector within the chamber in line with the cavities when shifted and a cam and connections to the slide for reciprocating the ejector intermediate to the movements of the wheel, while the cavities are held stationary.

10. In a cigarette-machine, the combination with a filler-wheel provided with a series of molds having each a movable jaw at one side, of an adjacent shell-carrier with a series of sockets therein and means for feeding cigarette-shells to the sockets, means for turning the filler-wheel and the shell-carrier intermittingly to aline the shells with the molds, and means to force the fillers into the shells successively.

11. In a cigarette-machine, the combination, with a filler-wheel provided with a series of molds having each a movable jaw at one side, of an adjacent shell-carrier with a series of sockets therein and means for feeding cigarette-shells to the sockets, ratchet-wheels connected with the filler-wheel and with the shell-carrier, a reciprocating bar with pawls fitted respectively to the said ratchet-wheels, whereby the mold-wheel and shell-carrier are moved in unison intermittingly to bring the molds in line with the shells, and means to force the fillers from the molds into the shells.

12. In a cigarette-machine, a filler-wheel having the disk P with a series of stationary mold-jaws $a'$ fixed at intervals thereon in the same plane, the series of pressing-jaws $a$ fixed movably upon the disk adjacent to the jaws $a'$, and provided each with a spring to hold the mold-cavity normally closed, means for turning the wheel intermittently to admit fillers successively to the mold-cavities, and means operated while the wheel is stationary to open the molds successively to receive the fillers, whereby the fillers are molded by the jaws and the spring-pressure during the rotation of the wheel.

13. In a cigarette-machine, the combination, with a filler-wheel having a series of stationary jaws fixed at intervals thereon, of a series of pressing-jaws movable adjacent to such fixed jaws and provided each with a spring to hold the mold-cavity normally closed, and a projection or dog to engage a latch, means for turning the wheel intermittingly to admit a filler to each mold-cavity at the same point, a latch arranged adjacent to such point to engage the movable jaw, and a cam to actuate the latch when required to open the mold.

14. In a cigarette-machine, the combination, with a filler-wheel having a series of stationary jaws fixed at intervals thereon, of a series of pressing-jaws movable adjacent to such fixed jaws and provided each with a spring to hold the mold-cavity normally closed, a latch-arm with latch jointed thereon in the path of the dog upon the pressing-jaw, and a cam and connections to actuate the latch-arm for opening the mold when in position to receive the filler.

15. In a cigarette-machine, the combination, with a filler-wheel having a series of stationary radial jaws fixed at intervals thereon around a central chamber, of a series of pressing-jaws movable adjacent to such fixed jaws and provided each with a spring to hold the mold-cavity normally closed, means for turning the wheel intermittingly to admit fillers successively to the mold-cavities, means for turning the molds successively to receive the fillers, and an ejector operated from the central chamber of the wheel to discharge the fillers successively from the mold-cavities while pressed by their respective spring-jaws.

16. In a cigarette-machine, the combination, with a filler-wheel having a series of cavities to receive individual fillers and a central chamber to receive an ejector, and means for supplying the fillers to the cavities, of an adjacent vertical wheel having a circular series of horizontal sockets to operate as a shell-carrier, means for feeding cigarette-shells to the sockets, means for turning the filler-wheel and the shell-carrier intermittingly to aline the shells with the cavities, means to eject the fillers from the cavities into the shells, and means for successively discharging or stripping the filled shells from the shell-carrier.

17. In an apparatus for making cigarettes from a continuous cigarette-rod, the combination, with means for making a continuous paper tube and dividing the same into individual shells, of means for forming a continuous filler-rod and dividing the same into individual fillers, a wheel having cavities to receive the individual fillers, a carrier to receive the individual shells, means for bringing the fillers and shells successively in line with one another, and means for forcing the fillers into the shells.

18. In a cigarette-machine, the combination, with a wheel having cavities to receive the individual fillers, of means for supplying the fillers thereto, a shell-carrier having a series of sockets to receive paper shells, means to form a continuous paper tube, shears operated to grasp the tube and cut off a shell and simultaneously force it into one of the sockets, means for bringing the shells successively in line with the fillers, and means to force the fillers in succession into the shells.

19. In an apparatus for making cigarettes from a continuous filler-rod, the combination, with means for making a continuous filler-rod and dividing the same into individual fillers, of a filler-wheel having a series of radial cavities to receive the individual fillers, and a central chamber to receive an ejector, a shell-carrier having a series of sockets to receive paper shells, means to form a continuous paper tube, shears operated to grasp the tube and cut off a shell and simultaneously force it into one of the sockets, means for bringing the shells successively in line with the cavities containing the fillers, an ejector reciprocated from the central chamber of the wheel to discharge each filler in succession to the opposed shell, means for intermittingly turning the shell-carrier to remove the filled shell from the cavity, and means for discharging the filled shell from the carrier when thus moved.

20. In a cigarette-machine, the combination, with a filler-wheel having a series of cavities to receive individual fillers and a central chamber to receive an ejector, and means for supplying the fillers to the cavities, of an adjacent vertical wheel having a circular series of horizontal sockets to operate as a shell-carrier, a bearing carrying the locator U in line with the circle of the sockets, means to feed the shells successively to the sockets, a nozzle between the filler-wheel and the carrier-wheel, (the locator, one of the sockets, and the nozzle being in line with one of the cavities when the filler-wheel is suitably turned,) a cam and connections to the locator to press each shell in succession upon the nozzle, an ejector operating from the chamber in the filler-wheel to discharge each filler in succession to the shell, and means for retracting the locator when the shell is filled, to permit the discharge of the shell from the nozzle by the final movement of the ejector.

21. In a cigarette-machine, the combination, with means for making a continuous filler-rod and dividing the same into individual fillers, of a filler-wheel having a series of cavities to receive individual fillers and a central chamber to receive an ejector, and means for delivering the fillers to the cavities, an adjacent vertical wheel having a circular series of horizontal sockets to operate as a shell-carrier, means to form a continuous paper tube, shears operated to grasp the tube and cut off a shell and simultaneously force it into one of the sockets, means for bringing the shells successively in line with the cavities containing the fillers, a nozzle supported between one of the cavities and one of the sockets, when in line with one another, a bearing carrying the locator U in line with the cavity, the nozzle and socket, the cam and connections to the locator to press each shell in succession upon the nozzle, an ejector reciprocated from the central chamber of the wheel to discharge each filler in succession to the opposed shell, means for retracting the locator when the shell is filled, to permit the discharge of the shell from the nozzle by the final movement of the ejector, means for intermittingly turning the shell-carrier, and means for discharging the filled shells successively from the shell-carrier, substantially as herein set forth.

In testimony whereof I have hereunto set my hand in the presence of two subscribing witnesses.

FRANK J. LUDINGTON.

Witnesses:
THOMAS S. CRANE,
WALTER H. TALMAGE.